United States Patent Office 2,715,617
Patented Aug. 16, 1955

2,715,617

BEARING COMPOSITIONS CONTAINING POLYTETRAFLUOROETHYLENE

Hobart S. White, Bethesda, Md., assignor to the United States of America as represented by the Secretary of the Navy No Drawing. Application July 29, 1954,
Serial No. 446,685

12 Claims. (Cl. 260—41)

(Granted under Title 35, U. S. Code (1952), sec. 266)

This invention relates to bearing compositions which are free of oil.

In certain equipment, such as aircraft instruments, it is highly advantageous for mechanism to be free of the requirements of oil lubrication and the servicing of oil lubricated parts. Bearings meeting these requirements should not only be oil-free but also should possess acceptibly low co-efficients of friction and be able to function efficiently in all the varied temperatures met with in aircraft and other uses.

Generally stated, this invention is a bearing composition formed of polytetrafluoroethylene resin strongly reinforced by molybdenum or tungsten powders and with or without a pigment.

An important object of the invention is to provide a satisfactory low friction bearing which is oil-free. An object, also, is to provide a bearing composition which, when applied to instrument use, does not require repeated cleaning or other servicing. Another object is to provide an oil-free bearing composition which maintains operative qualities in the wide temperature ranges of aircraft uses.

Other objects and features will appear on consideration of the following description of the method of making the composition including illustrative examples.

The primary materials entering into the composition of the bearings are polytetrafluoroethylene resin and powdered particles of molybdenum or tungsten or a mixture of these metals, the resin serving as a binder and a low friction agent and the molybdenum and tungsten powder serving not only to provide wear resistance but also to increase the compressive and flexural strength.

The size of the metal powder particles is between 0.01 and 10.0 microns, with preferable diameters between 0.5 and 5.0 microns.

Tetrafluoroethylene resin, usually referred to by the descriptive term, polytetrafluoroethylene, is a white plastic, waxy in appearance and transparent in thin sheets. It is crystalline, with good stability from −320° F. to 500° F. and is chemically inert to known reagents and solvents except molten alkaline metals and gaseous fluorine under pressure.

As here used, the polytetrafluoroethylene is in the form of a powder or suspensoid while being mixed with the metal powder, the particle size of the resin powder ranging from 1 to 100 microns and the particle size of the suspensoid ranging from about 0.01 to 10.0 microns and preferably 0.05 to 5.0 microns. The difference in particle size as between the powdered resin and the suspensoid is due to the tendency of the powdered resin particles to agglomerate and thus form larger particles than in the case of the suspensoid.

A commercial polytetrafluoroethylene suspensoid with or without a pigment may be used for mixing with the metal powders. The mixture of metal and resin powders is compressed at pressures ranging from 1000 to 15,000 pounds per square inch (p. s. i.) and fused at temperatures ranging from 650° F. to 750° F.

EXAMPLE 1

A polytetrafluoroethylene aqueous suspensoid (known commercially as Teflon Clear Finish) and molybdenum metal powder classified as having a particle size from 0.5 to 5.0 microns are used in this example. The suspensoid consists primarily of polytetrafluoroethylene, water and toluene, a satisfactory composition consisting of:

| | Per cent |
|---|---|
| Polytetrafluoroethylene | 44.0 |
| Water | 47.4 |
| Toluene | 6.0 |
| Sodium salt of the sulphuric acid ester of a mixture of long chain alcohols, predominantly lauryl alcohol | 1.1 |
| Long chain alkyl aryl polyether alcohol | 1.5 |
| | 100.0 |

Equal proportions by weight are thoroughly mixed by stirring in a container, then poured on a clean metal plate for partial drying. After this partial drying, the mixture is returned to the container, stirred again, and then allowed to dry until in the form of a stiff paste. This stiff paste is transferred to a heavy-walled steel tubing, steel plungers are inserted in each end, and pressure is applied to form a slug of the composition, free of voids. The slug is then removed and dried on a hot plate, or by other suitable means, at temperatures not exceeding 400° F. The dried slug is now inserted in the steel tubing previously referred to and the tubing mounted in a hydraulic press under nominal zero pressure.

A moving flame is now applied to the outer wall of the steel tubing until a 700° F. Tempilstick indicates a temperature of 700° F. when stroked on the cylinder wall. After maintaining this temperature for about five minutes, the load from the hydraulic press is increased until the computed pressure at the ends of the steel plungers is about 13,000 pounds per square inch, whereupon the flame is removed, the pressure decreasing while the sample is cooling, due to the contraction of the sample, the load adjustment remaining undisturbed. After cooling below about 200° F. the finished sample is removed from the steel tubing. A sample, as prepared according to this example, shows, by density determination, 35% by weight or 69% by volume of polytetrafluoroethylene.

EXAMPLE 2

A mixture of pigmented polytetrafluoroethylene aqueous suspensoid (known commercially as Teflon One Coat Enamel) and molybdenum powder classified as having a particle size from 0.5 to 5.0 microns was prepared, the substances having the following parts values by weight:

| Substance: | Parts by weight |
|---|---|
| Polytetrafluoroethylene suspensoid (pigmented) | 100 |
| Molybdenum powder | 50 |
| Acetone | 200 |

The pigmented suspensoid consists predominantly of polytetrafluoroethylene, water, pigment and toluene, a satisfactory composition being as follows:

| | Per cent |
|---|---|
| Polytetrafluoroethylene (finely divided) | 34.6 |
| Chromium tetrahydrate (green pigment) | 9.0 |
| Water | 49.5 |
| Toluene | 4.8 |
| Sodium salt of the sulphuric acid ester of a mixture of long chain alcohols, predominantly lauryl alcohol | 1.0 |
| Long chain alkyl aryl polyether alcohol | 1.1 |

The mixture of polytetrafluoroethylene suspensoid, molybdenum powder and acetone is blended in a Waring blender for about 5 minutes and then poured into a receptacle where it is permitted to settle, most of the liquid being then decanted and further liquid being removed with absorbent paper. When dry enough to form a stiff paste, the composition is pressed in a steel tube at 3000 pounds per square inch to form a void-free slug. The slug is then removed and dried on a hot plate at about 400° F., after which it is re-inserted in the steel tubing and molded as described in Example 1, with a computed pressure of 10,000 pounds per square inch at 700° F.

The approximate composition of the bearing composition made as in the second example is:

| Substance | Percent Weight | Volume |
|---|---|---|
| Polytetrafluoroethylene | 37 | 64 |
| Chromium tetrahydrate pigment | 10 | 16 |
| Molybdenum powder | 53 | 20 |

Compositional parts by weight of other examples are shown in the following table:

Table 1

| Composition | Polytetrafluoroethylene, Percent | Metal Powder, Percent | Volume, Percent | Pigment, Percent |
|---|---|---|---|---|
| 3 | 27 | 73 Mo | 40 | 0 |
| 4 | 17 | 83 Mo | 54 | 0 |
| 5 | 15 | 85 Mo | 58 | 0 |
| 6 | 22 | 78 W | 29 | 0 |
| 7 | 10 | 90 W | 50 | 0 |
| 8 | 24 | 70 Mo | | 6 |

From the above and other examples it has been found that a composition showing excellent low-friction and wear qualities can be prepared with a range variation by weight of polytetrafluoroethylene of 10% to 60%.

The compositions as above described have satisfactory physical properties for bearing use without employment of oils and greases. For example, compositions 1, 3, 4, 5, 6, and 7 (Table 1) when applied to hardened stainless steel shafts ¼ inch in diameter at room temperature with a 643-gram load, show values of co-efficient of friction as compared with lapped and polished sapphire, as follows:

Table 2

| Composition | Coefficient of Friction | | |
|---|---|---|---|
| | 3 R. P. M.a (0.2 F. P. M.)b | 15 R. P. M. (1.0 F. P. M.)b | 300 R. P. M. (20 F. P. M.) |
| 1 | 0.20 | 0.21 | 0.23 |
| 3 | 0.13 | 0.15 | 0.20 |
| 4 | 0.20 | 0.21 | 0.23 |
| 5 | 0.20 | 0.21 | 0.23 |
| 6 | 0.18 | 0.20 | 0.22 |
| 7 | 0.26 | 0.26 | 0.28 |
| Sapphire | 0.18 | 0.20 | 0.36 | a Revolutions per minute.
b Feet per minute.

Also, in the case of composition 3, for example, there was no determinable wear per hour at 15 R. P. M. or 150 R. P. M., the wear in milligrams per hour at 295 R. P. M. being 0.012. The density value of this bearing sample was 4.9 gm./cc.

In the course of tests on the bearing material it was learned that for relatively small shafts less than one-sixty-fourth inch in diameter, a metal particle size of less than 10 microns is particularly desirable so that a suitable bearing surface consistent with the shaft size may be obtained. It was also ascertained that foreign substances, such as the pigment of Example 2, are usable provided they do not detract from the desired low friction and low wear properties of the compositions.

It was found that resin-metal compositions, as described, operate satisfactorily in the temperature range of −60° C. to 75° C. applicable to aircraft equipment. Although primarily developed for bearings operating in the above range, the properties of the compositions are such that they may be used in the range from −200 to 250° C.

While specific composition substances and process procedures have been indicated, it is apparent that variations and modifications may be made. For example in the specific Examples 1 and 2, use of polytetrafluoroethylene in suspensoid form has been indicated to utilize its finer particle subdivision. For larger bearings, however, the polytetrafluoroethylene in powder form is adequate. Also, while other metals may be used, molybdenum and tungsten have the desirable property of forming into exceedingly small particle sizes, which is important in obtaining a uniform pressure resistance surface. Other changes are possible and hence no restrictions are intended other than may be required by the appended claims.

The invention described herein may be manufactured and used by or for the Government of the United States of America for governmental purposes without the payment of any royalties thereon or therefor.

What is claimed is:

1. A bearing composition comprising a homogeneous compressed mixture of powdered tetrafluoroethylene resin and at least one metal of the group consisting of molybdenum, tungsten and mixtures thereof, the resin forming 10 to 60 percent by weight of the composition.

2. The bearing composition as defined in claim 1, the particle size of the metal being between 0.01 and 10.0 microns.

3. The bearing composition as defined in claim 2 with the particle size of the metal being preferably between 0.5 and 5.0 microns.

4. The bearing composition as defined in claim 2, the particle size of the resin ranging between approximately 0.01 and 10.0 microns.

5. The bearing composition as defined in claim 4 with the particle size of the resin being preferably between 0.05 and 5.0 microns.

6. The bearing composition as defined in claim 1 with the particle size of the metal ranging from 0.5 to 5.0 microns and the particle size of the resin ranging from 0.5 to 5.0 microns.

7. A bearing composition comprising a coherent mass of polytetrafluoroethylene in admixture with molybdenum metal powder, the polytetrafluoroethylene forming by weight from 10% to 60% of the composition.

8. A bearing composition comprising a coherent mass of polytetrafluoroethylene in admixture with tungsten metal powder, the polytetrafluoroethylene forming by weight from 10% to 60% of the composition.

9. A bearing composition comprising a coherent mass of polytetrafluoroethylene in admixture with metal powders of both molybdenum and tungsten, the polytetrafluoroethylene forming by weight from 10% to 60% of the composition.

10. A bearing composition comprising a coherent admixture of polytetrafluoroethylene, chromium tetrahydrate pigment and molybdenum metal powder, the parts by weight, respectively, of said substances being 37, 10 and 53.

11. A bearing composition comprising a coherent admixture of polytetrafluoroethylene and molybdenum metal powder, the polytetrafluoroethylene forming by weight 35% of the composition.

12. A bearing composition comprising a coherent compressed mixture of powdered polytetrafluoroethylene and powdered particles of a metal from the group consisting of molybdenum and tungsten and mixtures thereof, said composition having a coefficient of friction at one foot per minute of about 0.21.

References Cited in the file of this patent

UNITED STATES PATENTS

| | | |
|---|---|---|
| 2,559,750 | Berry | July 10, 1951 |
| 2,689,380 | Tait | Sept. 21, 1954 |